United States Patent [19]

Ichihara et al.

[11] Patent Number: 5,511,001
[45] Date of Patent: Apr. 23, 1996

[54] CD-ROM (COMPACT DISC READ-ONLY MEMORY) REGENERATIVE UNIT

[75] Inventors: Kazuo Ichihara; Shingo Izuta, both of Daito, Japan

[73] Assignee: Funai Electric Co., Ltd., Daito, Japan

[21] Appl. No.: 61,908

[22] Filed: May 14, 1993

[30] Foreign Application Priority Data

May 19, 1992 [JP] Japan .................................. 4-151549
Aug. 5, 1992 [JP] Japan .................................. 4-229137

[51] Int. Cl.$^6$ .................................................. G06F 17/00
[52] U.S. Cl. .................................................. 364/514 R
[58] Field of Search .................... 364/514 R, 514 A; 84/601, 602, 603, 645; 360/32, 48; 348/552

[56] References Cited

U.S. PATENT DOCUMENTS

| | | | |
|---|---|---|---|
| 5,046,004 | 9/1991 | Tsumura et al. | 364/419 |
| 5,092,216 | 3/1992 | Wadhams | 84/602 |
| 5,129,036 | 7/1992 | Dean et al. | 348/552 |
| 5,187,352 | 2/1993 | Blair et al. | 84/601 |
| 5,192,999 | 3/1993 | Graczyk et al. | 348/552 |

FOREIGN PATENT DOCUMENTS 0011025  5/1980  European Pat. Off. .

OTHER PUBLICATIONS

Shawj "Classical Fans Get CD-ROM Packages"; Billboard; Aug. 11, 1990.

*Primary Examiner*—Ellis B. Ramirez
*Attorney, Agent, or Firm*—Lackenbach Siegel, et al.

[57] ABSTRACT

An I/F portion 3 which connects and switches a CD-ROM drive 1 and a digital sound circuit 2 to a host computer 5, is provided to integrate the CD-ROM drive and the sound board. And at the left and right sides of an insertion entrance 35 of a cabinet 31 having an accommodation portion which accommodates a drive unit A of the CD-ROM, an amplifier 38 which outputs sound output to the speaker by amplifying the output from the CD-ROM drive unit A and a speaker 33 which operates by the output of the amplifier 38 are provided.

3 Claims, 9 Drawing Sheets

CD-ROM (COMPACT DISC READ-ONLY MEMORY) REGENERATIVE UNIT

BACKGROUND OF THE INVENTION

This invention relates to a CD-ROM (Compact Disc Read-Only Memory) regenerative unit, for instance, which regenerates a disc wherein information or programs called "CD-ROM" are recorded as digital signals, or performs enlargement or processing of the programs recorded therein to indicate to a display or the like while also sounding a speaker.

Heretofore, a CD-ROM drive as an outer memory unit of a computer was used at the same time with a sound board which is a sound source unit in its usage (chiefly for recreation). However, the CD-ROM drive and the sound board are processed separately.

Figure 9:
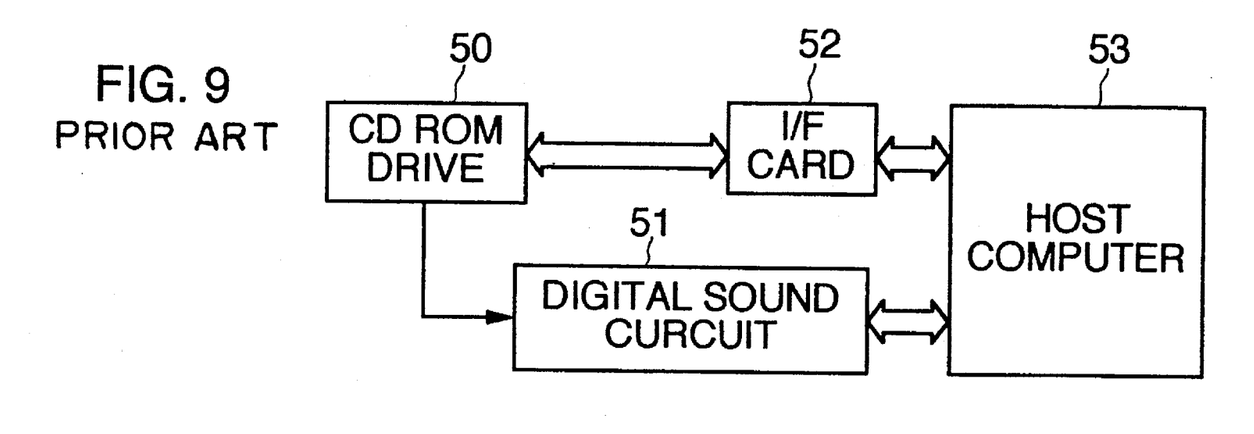
FIG. 9 is a connected view according to a conventional CD-ROM I/F card.
Figure 10:
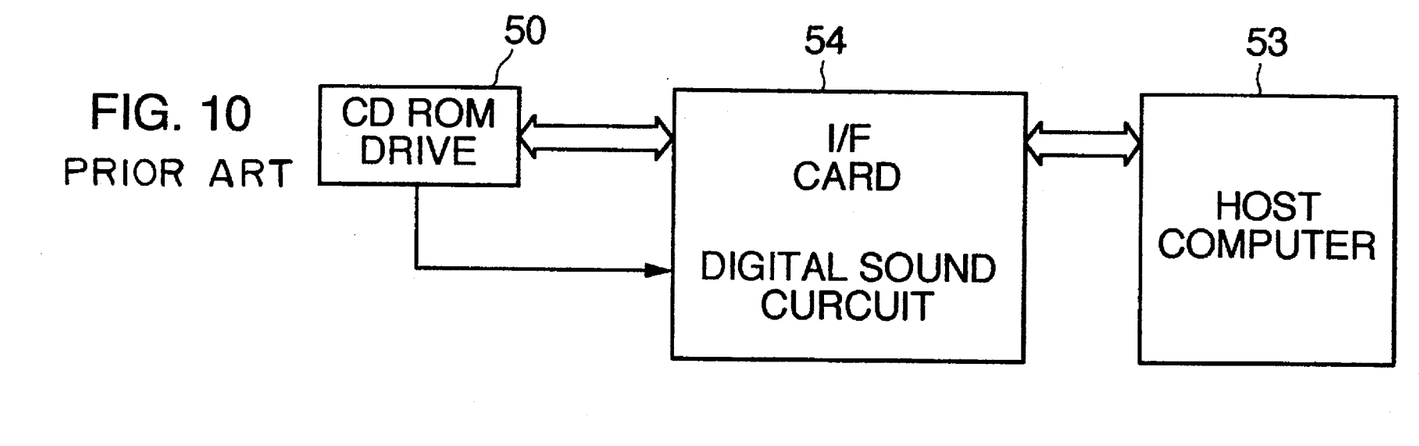
FIG. 10 is a connected view according to a conventional CD-ROM and I/F card for a digital sound circuit.

FIG. 9 is a diagram of the connections of the conventional CD-ROM and I/F (interface) card, and FIG. 10 is a diagram of the conventional CD-ROM and I/F card using a digital circuit in common.

In FIG. 9, the CD-ROM drive 50 is connected to a host computer 53 through the I/F (interface) for CD-ROM drive. The digital sound circuit 51 is connected to the host computer 53 through the digital sound circuit card.

In FIG. 10, the digital sound circuit 54 and the I/F of the CD-ROM drive 50 are connected to the host computer 53 as one sheet of card.

Figure 1:
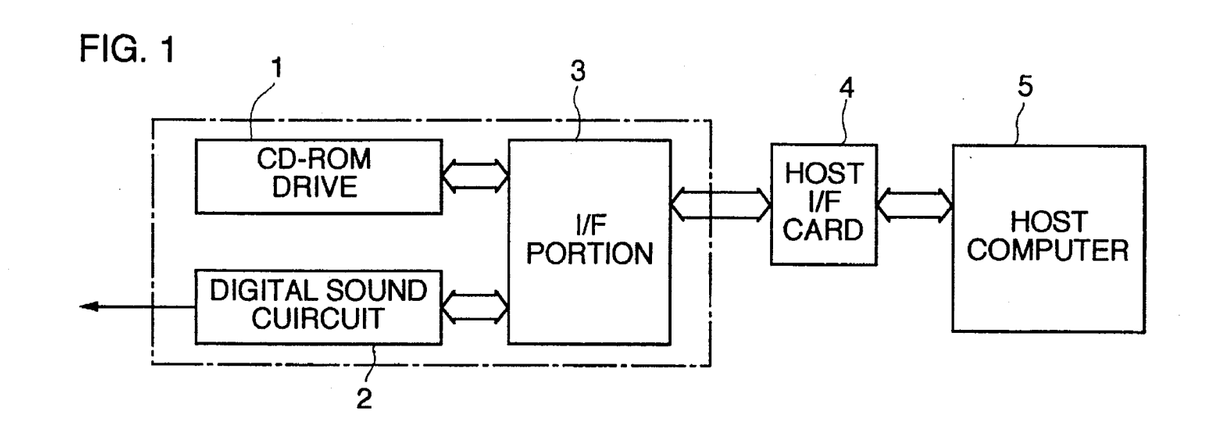
FIG. 1 is a structure view of a CD-ROM drive incorporating a sound board therein according to a first embodiment.

However, in the conventional technique shown in FIG. 1, the CD-ROM drive 50 and the digital sound circuit 50 are separate cards, respectively, which causes difficulties when using it with a host computer such as a lap-top personal computer having only one card slot.

Further, in the conventional technique shown in FIG. 10, since the CD-ROM drive 50 and the I/F of the digital sound circuit 54 form one sheet of card, its card size becomes larger, which causes difficulties when using it with a host computer which has only a half size of the card slot space as in the lap-top personal computer.

Figure 11:
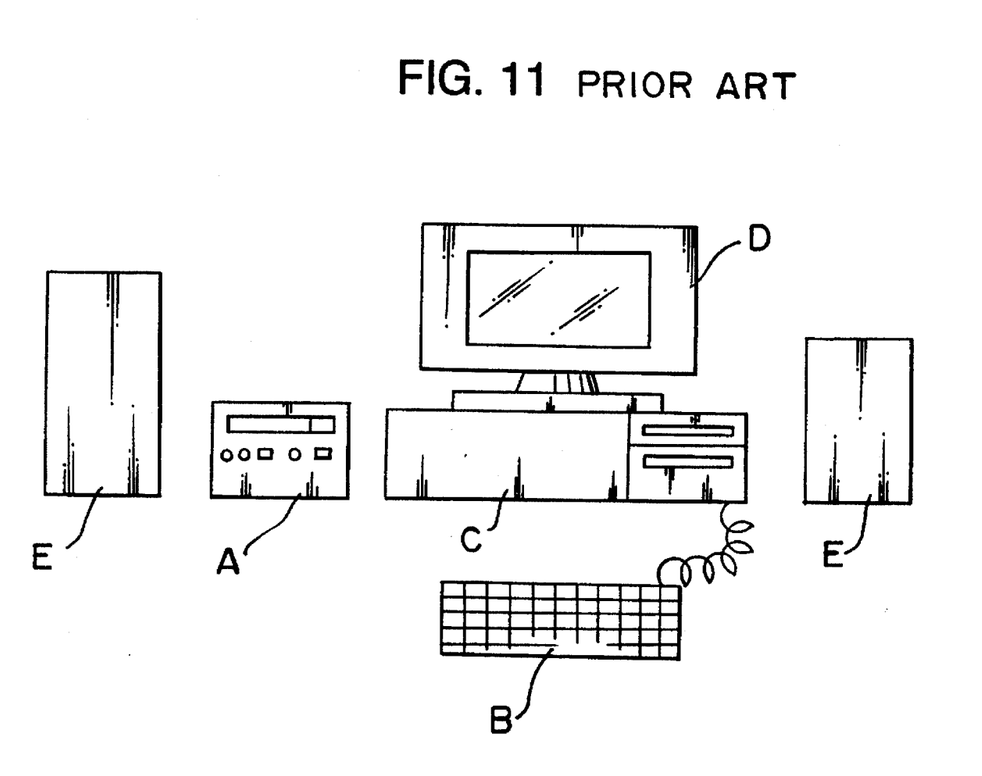
FIG. 11 is an elevation view which shows an example of an arrangement of a conventional CD-ROM regenerative unit.

FIG. 11 is a drawing which shows a component of the ROM disc in another conventional technique.

This component of the ROM disc is composed of each element of a drive unit A of the CD-ROM, a centralized control computer C controlled by input from a keyboard B by memorizing output from the drive unit A, a display D and speaker units E.

However, in such a conventional unit, in order to release sound from the speaker accompanied by an indication on the display which occurs by enlargement of the regeneration and a function of the disc, an arrangement as shown in FIG. 11 is required on the desktop, and wiring between each element must be performed. This results in confusion of the wiring.

Further, since the area required for this arrangement is large, it is impossible to arrange the conventional unit on only one desk. Accordingly, an arrangement with two desks is necessary, setting the speaker unit E at a place away from the desk and arranging the CD-ROM drive unit A on the other desk.

Since the wiring between each element is done according to such an arrangement, it is insufficient to use only one desk. Accordingly, since the wiring must be done on the floor, the wiring is apt to become damaged by being caught underfoot.

This invention is performed in view of such problems, and its object is to provide a CD-ROM regenerative unit which can connect to even a small type lap-top personal computer by integrating the CD-ROM drive and the digital sound circuit.

Another object of this invention is to provide a CD-ROM regenerative unit which can be sufficiently arranged on one desk, enabling an input keyboard to be positioned at the front side of each element, and allowing arrangement in a controlled state with easy input and easy wiring, without using the floor.

BRIEF DESCRIPTION OF THE INVENTION

The CD-ROM unit of this invention is provided with a CD-ROM drive which reads the recording data of the computer data memorized in CD-ROM, a digital sound circuit which converts the digital sound data of the above recording data to an audio signal, and an I/F portion which communicates data between a host computer and said CD-ROM drive and digital sound circuit by connecting and switching said CD-ROM drive and digital sound circuit to the host computer. A speaker amplifier and a speaker which regenerate an audio signal output in said CD-ROM drive and said digital sound circuit are provided in the same unit.

Further, a connector for connecting a printer to the I/F portion is also provided.

In addition, in this invention, the amplifier which amplifies the output from said CD-ROM drive unit and the speaker which operates by the output of said amplifier are contained in the same unit in a cabinet having an accommodating portion which removably accommodates a CD-ROM drive unit which drives a CD-ROM.

By the above structure, the CD-ROM drive which reads computer data, digital sound data or an image is connected to the I/F portion and the I/F portion is connected and processed so that the communication of data may be performed between the host computer and the CD-ROM drive through the host I/F card. On the other hand, the digital sound data which is an output of the CD-ROM drive is input into the digital sound circuit. The digital sound circuit is also connected to the host computer through the I/F portion and converts the digital sound data to the audio signal to make a headphone output. The I/F portion distinguishes the input data and switches its connection to the CD-ROM drive or the digital sound circuit, which enables both conversion processing of computer data processing and a digital sound by the same CD-ROM drive.

Since the speaker amplifier and the speaker are incorporated removably within the digital sound circuit, it may be used as it is as a regenerative unit of a voice.

Further, since the connector for the printer connection is provided at the I/F portion, the connection of the CD-ROM drive and the digital sound circuit also becomes easy.

Furthermore, since the CD-ROM drive unit, and the amplifier and the speaker which output the sound output to the speaker are contained in a cabinet, these units can be placed on one desk in a state wherein each element is in arrangement by placing the display and providing a keyboard at the front of the computer for centralized control.

DETAILED DESCRIPTION OF THE INVENTION

Embodiments of this invention will be described as follows, with reference to the drawings.

Figure 2:
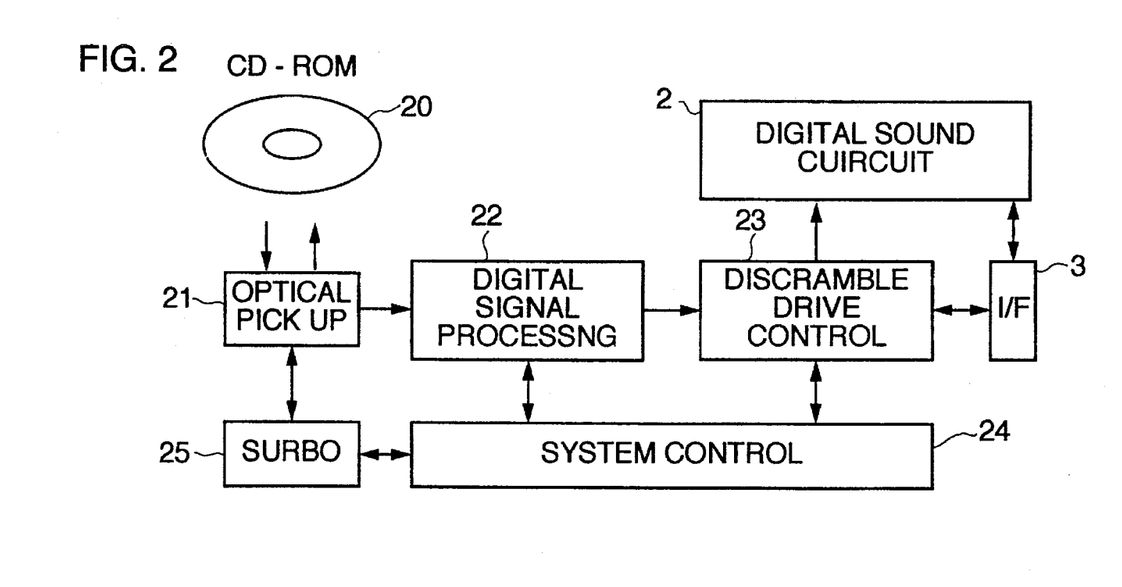
FIG. 2 is a structure view of the CD-ROM drive shown in FIG. 1.
Figure 3:
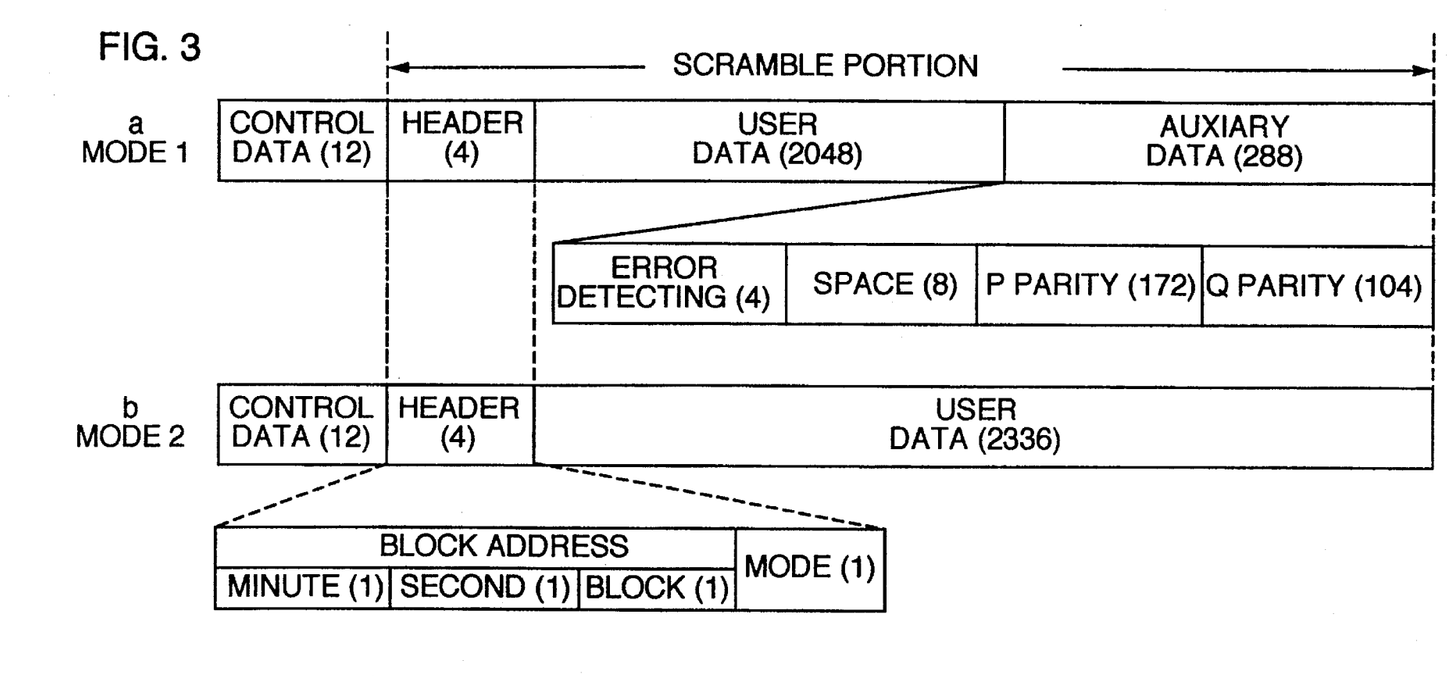
FIG. 3 is a format of the CD-ROM shown in FIG. 2.

FIG. 1 to FIG. 3 are structure views of the CD-ROM drive including a sound board therein according to a first embodiment of this invention.

In FIG. 1, the CD-ROM which records the computer data and the digital sound data is read out by the CD-ROM drive 1 and the taking in-and-out of the computer data is performed through the I/F portion 3 and the host I/F card of the host computer 5.

On the other hand, in the case of the digital sound data, the computer data is sent out from the CD-ROM drive 1 to the digital sound circuit 2, and the digital sound circuit 2 is also connected to the I/F portion 3 and connected to the host computer 5 through the I/F portion 3, said digital sound data being converted into the audio signal to generate a voice.

Next, this operation is described.

FIG. 2 is a structure view of the CD-ROM drive shown in FIG. 1.

FIG. 3 is a format of the CD-ROM shown in FIG. 2.

First, data from the CD-ROM 20 is read by an optical pickup 21. The format of the read data is shown only as "a mode 1", and "b mode 2".

The term "control data" at the top is a fixed and synchronized pattern of 12 bytes, and 3 bytes among 4 bytes of the header is the same address information and mode information as a Q channel of CD subcode. From this control information, it can be distinguished whether the data is a digital sound or CD-ROM data.

When the mode information is 1, the mode is 1, and when the mode information is 2, the mode becomes 2. In case of mode 1, since the bit error rate more increases more by P parity and Q parity by an auxiliary data 288 bytes, this is for computer data.

The mode 2 has no auxiliary data and is used for digital sound data of the music shot and for image data. ;

These data having format read by the optical pickup 21 are input to a digital signal processing IC (integrated circuit) 22 and are subjected to an EFM (Eight to Fourteen Modulation) decoding, de interleaving and error-correcting processing by CIRC (Cross Interleave Reed-Solomon Code) the same as a CD. A descrambling drive control IC 23 corrects computer error by a descrambling process and auxiliary data which is different from CD and a unique processing of CD-ROM . Further, the digital sound data is fed to the digital sound circuit 2. The numeral 24 is a total system control and a servo 25 is a servo control.

The CD-ROM drive 1 thus performing data processing is connected to the host computer 5 through the I/F portion 3, and an address search is performed by the absolute time (minute and second) shown by the header of mode 1 against the address of the data instructed by the host computer 5 whereby the control data (synchronized pattern of 12 bytes) is detected and the scrambling is released.

Then, an objective block is accessed from the address of the header portion and the objective user data (computer) thus obtained is taken in the host computer 5 as data after further performing error detecting and correcting by auxiliary data.

Further, when the data is digital data, the data descrambled by the descrambled drive control IC 23 is processed by the digital sound circuit 2. However, since the I/F portion 3 distinguishes the data and is connected to the host computer 5, the digital sound data which is the objective block data to be read by the host computer is headphone output as a voice regenerative signal by the digital filter of the digital sound circuit 2, the D/A converter and the audio circuit, or is incorporated as a voice as in the case where the host computer 5 treats the (??) as image data and indicates on the display.

Figure 4:
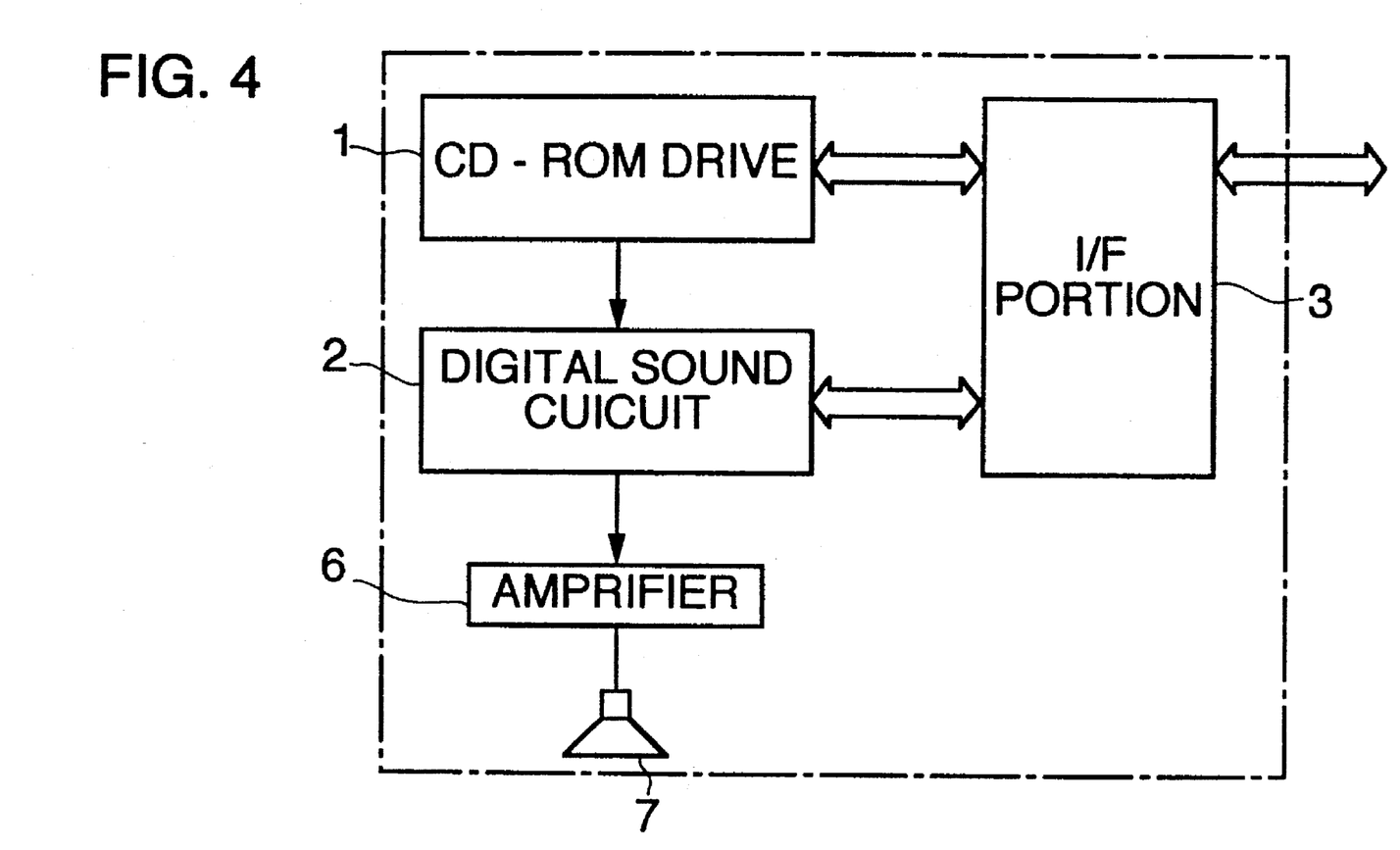
FIG. 4 is a structure view of the CD-ROM drive incorporating a sound board therein according to a second embodiment of this invention.

FIG. 4 is a view wherein a speaker amplifier 6 and a speaker 7 are added at the output side of the digital sound circuit 2 in the first embodiment and a voice is allowed to regenerate by the unit itself without use of an outer speaker or a headphone.

Figure 5:
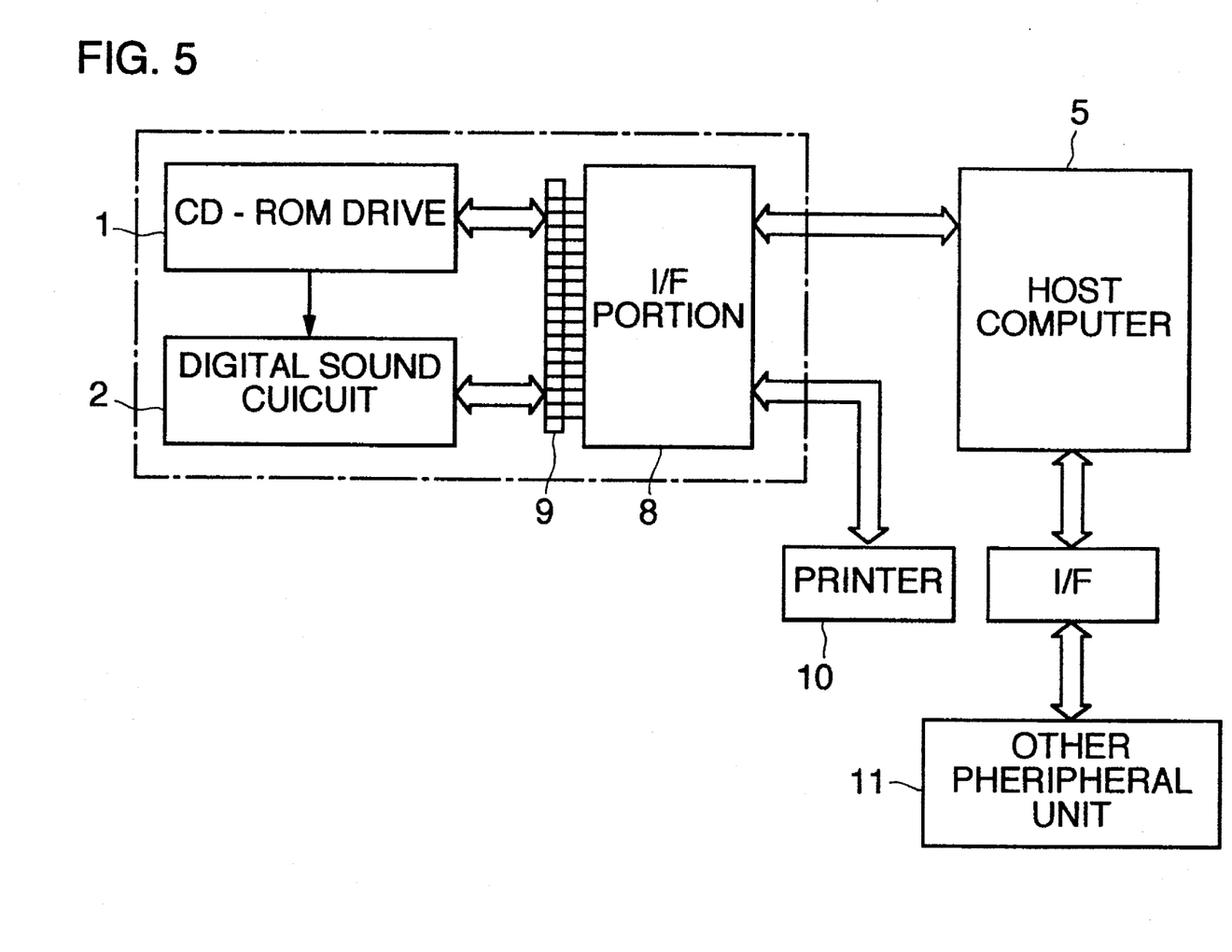
FIG. 5 is a structure view of the CD-ROM drive incorporating a sound board therein according to a third embodiment of this invention.

FIG. 5 is a structure view of the CD-ROM drive incorporating the digital sound board therein according to the third embodiment of this invention.

In the FIG. 5 structure, a connector 9 is provided at I/F portion 8 and a printer 10 is connected to the host computer 5 through this connector 9.

According to such a structure, the host computer 5 processes the computer data of the CD-ROM drive 1 whereby at the same time the editing and processing of data, such as its enlargement and reduction, or an output from the printer, can be obtained. The numeral 11 is a peripheral unit such as a floppy disc drive and others.

In such an embodiment, since the CD-ROM drive 1 and the digital sound circuit 2 are connected with the host computer 5 by the I/F portion 3, there is no need to use a separate I/F card and large-sized I/F cards, when the processing of both the CD-ROM data of the computer data and a voice can be obtained by only one CD-ROM drive incorporating the sound board therein. In addition, since a built-in speaker 7 is provided, the regeneration of voices can also be obtained with no relation of an outer speaker. If the I/F portion 8 is used, the costs can be lowered and a decrease of the operations in all systems can also be attained.

Figure 6:
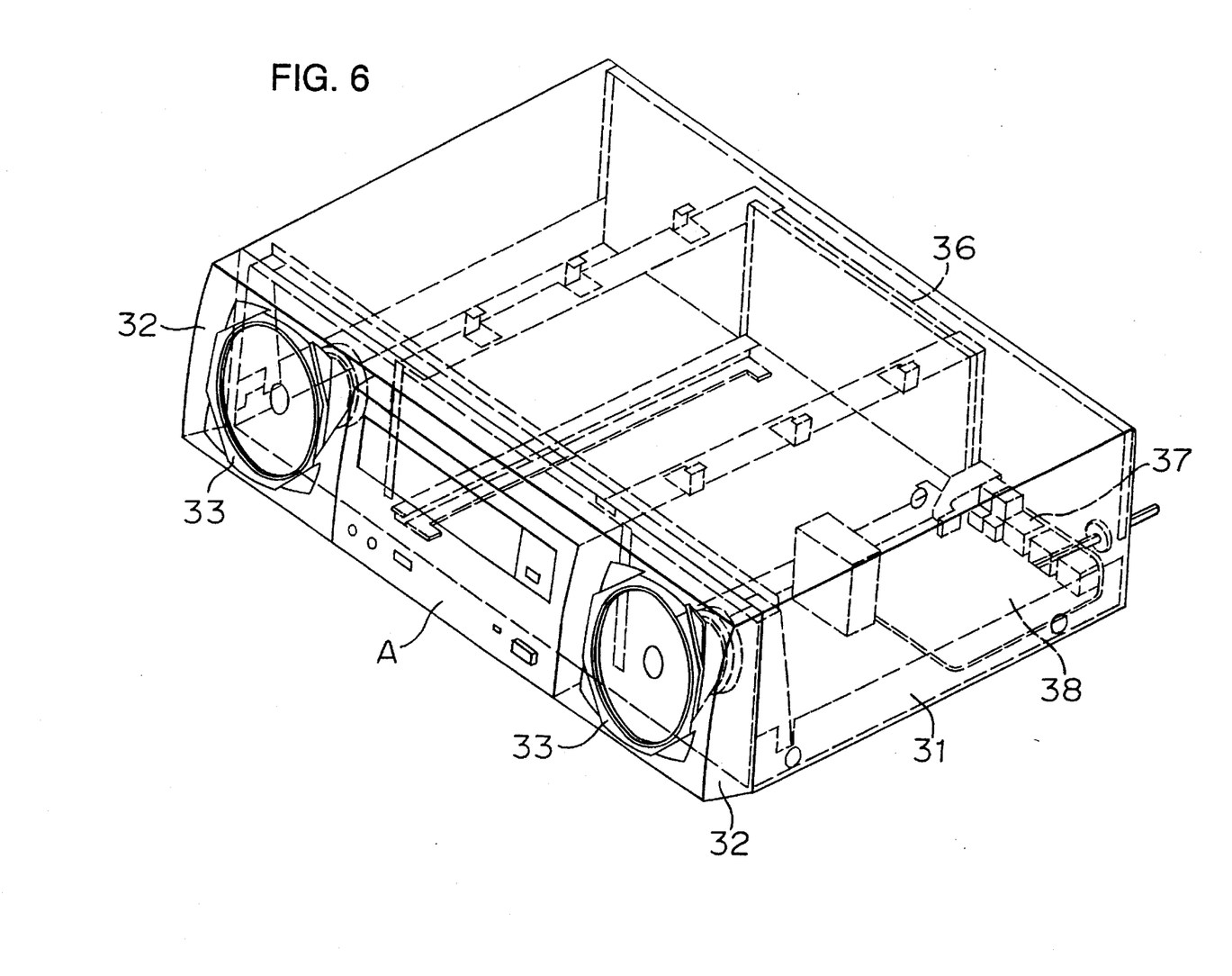
FIG. 6 is a view which shows a fourth embodiment and is a perspective view which of the CD-ROM drive unit contained in the cabinet.
Figure 7:
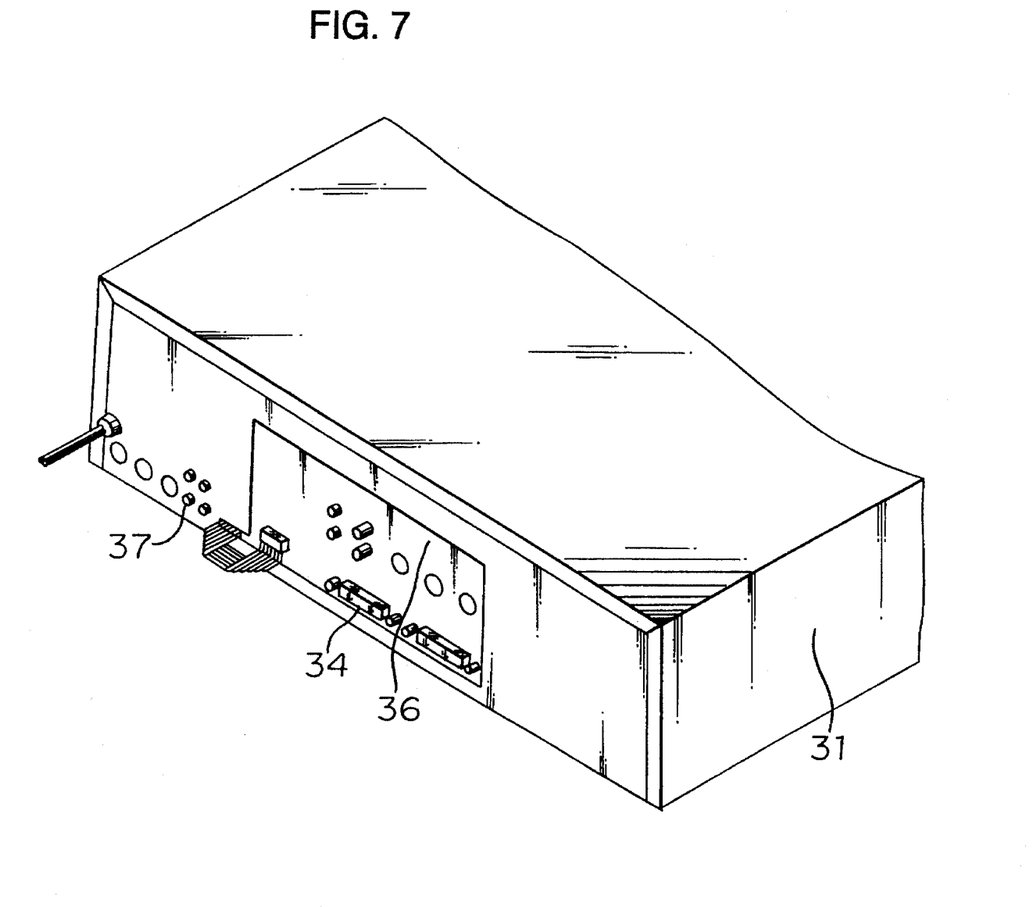
FIG. 7 is a perspective view which shows the rear surface of the fourth embodiment.
Figure 8:
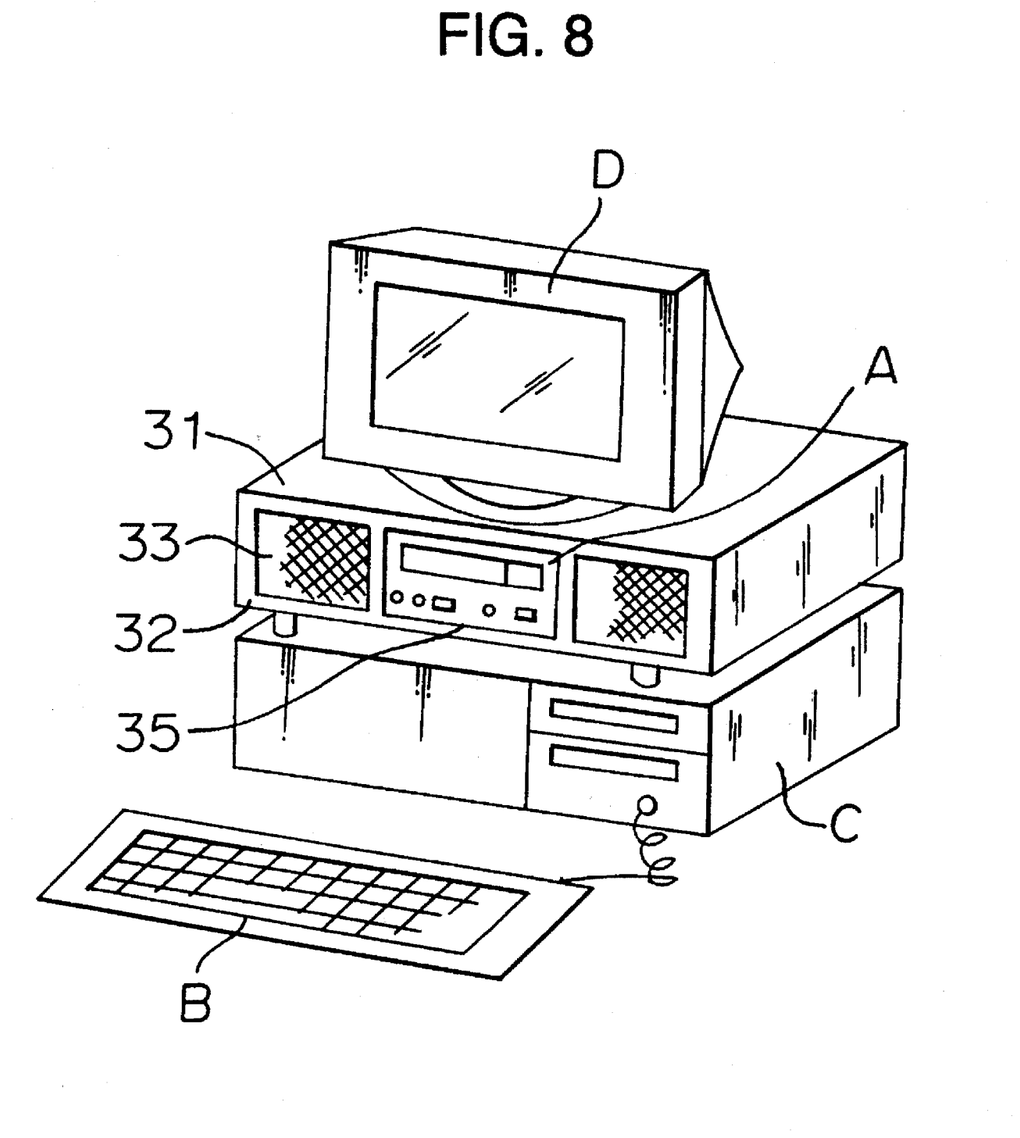
FIG. 8 is a perspective view wherein a display, a centralized control computer, and a keyboard are arranged on the desk of the fourth embodiment.

FIG. 6 to FIG. 8 are views which illustrate the fourth embodiment of this invention.

At a front panel 32 of a cabinet 31, speakers 33 are attached at the left and right sides thereof in order to regenerate sound for a stereo. At the front surface panel 32 before this speaker 33, a hole for sound releasing or a ledge is formed.

At the central portion of this front surface 32, an insertion entrance 35 of a CD-ROM drive unit A for CD-ROM regeneration is bored; said CD-ROM drive unit A is provided with a motor which rotates the disc, a turntable which places the disc thereon, a clamper which grasps the disc between the turntable, a pickup which reads digital signals, and a connector 34 for output which draws out the output of the pickup.

At the rear of the cabinet 31 which accommodates the drive unit A inserted from the insertion entrance 35, a connector hole 36 which disposes the connector 34 of said drive unit A at the back of the cabinet 31, is provided.

Further, at the rear surface of the speaker 33 of this cabinet 31, a connector 37 to which the output from the drive unit A is connected, is provided. In addition, in this cabinet an amplifier 38 which drives the speaker is contained therein and the output of the drive unit A is connected by a cable through the connector 34 and the connector 37 of the amplifier and amplified by the amplifier thereby driving the speaker.

Accordingly, since a speaker unit E and the drive unit A of the CD-ROM which are hitherto provided separately, are integrated so that they, as well as the display D may be placed on the centralized control computer C, these are arranged in a controlled state on the desk to reduce the setting area required. Accordingly, it is possible to see the image of the display D while inputting by arranging the keyboard at the front surface of the centralized control computer.

Furthermore, if the connection between the connectors 34 and 37 is performed automatically by shortening the length of the connecting cable between the drive unit A of the CD-ROM and the amplifier, or by accommodating the drive unit A in the cabinet 31, there is no need for the connecting cable nor of shortening the length thereof. Accordingly, the wiring is simplified and there is no exposure of the wiring from the amplifier 38 to the speaker 33 to the outside.

By arrangement on the desk in such an adjusted state, those which were formerly incapable of being housed on one desk can now be house on only one desk, thereby abridging the space.

Further, this can also be used as a music regenerative unit of the disc of a compact disc for audio in a state where the drive unit A of the CD-ROM is accommodated therein. Furthermore, the enlargement of available scope such as connecting the drive unit to another electron unit (e.g., a play device) by taking out the CD-ROM drive unit A from this cabinet is also possible.

As described above, according to this invention, by connecting and switching the digital sound circuit which converts the CD-ROM drive and the digital sound data to read the CD-ROM data to the host computer, the communication of the data between the host computer is enabled.

In addition, in this invention, since the incorporated speaker 7 (FIG. 4) is provided, or a printer (in FIG. 10) is connected to the CD-ROM drive through the I/F portion, a decrease in product cost and the simplification of assembly due to the integration of the CD-ROM drive and the sound board can be obtained.

On the other hand, since the CD-ROM drive unit is provided removably in one cabinet together with the speaker and the amplifier, each element can be in an arranged state when the CD-ROM drive unit is placed on the desk, simplifying the wiring.

What is claimed is:

1. An independent CD-ROM playback unit connectable to an independent personal computer comprising:

a CD-ROM drive for reading out audio data recorded optically on a CD-ROM and developing digital signals representative of the recorded audio data and connectable to an independent personal computer for reading out audio data outputs from the personal computer as digital signals;

a digital sound circuit integral with the CD-ROM drive for converting digital signals into into audio signals for playback;

an interface circuit in said unit for controlling applying of the digital signal outputs from the CD-ROM drive to the digital sound circuit for conversion into audio signals and for connecting of the CD-ROM drive to said independent personal computer and controlling communications between the said independent person computer and the CD-ROM drive and the digital sound circuit and the independent personal computer; and the CD-ROM drive, the digital sound circuit and said interface circuit being integrated as an independent unitary unit for housing thereof in a common housing.

2. An independent CD-ROM playback unit according to claim 1, including an amplifier connected in said digital sound circuit for amplifying the converted audio signals and at least one speaker connected to the amplified in said common housing for developing an audio output by said playback unit.

3. An independent CD-ROM playback unit according to claims 1 or 2, including a printer connection on the interface circuit for connecting a printer thereto.

* * * * *